Oct. 25, 1949.  H. KLEMPERER  2,486,176
SHOCK-EXCITED OSCILLATOR
Filed Feb. 12, 1946  2 Sheets-Sheet 1
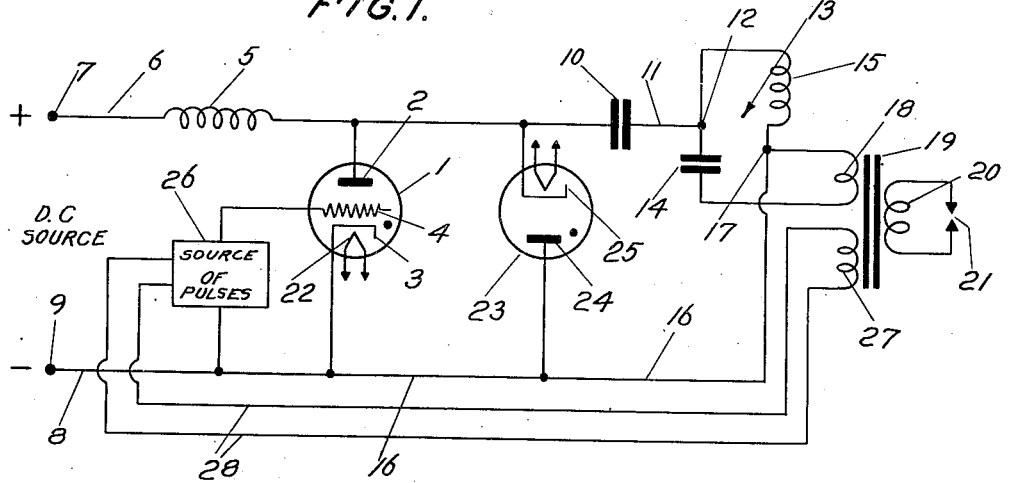
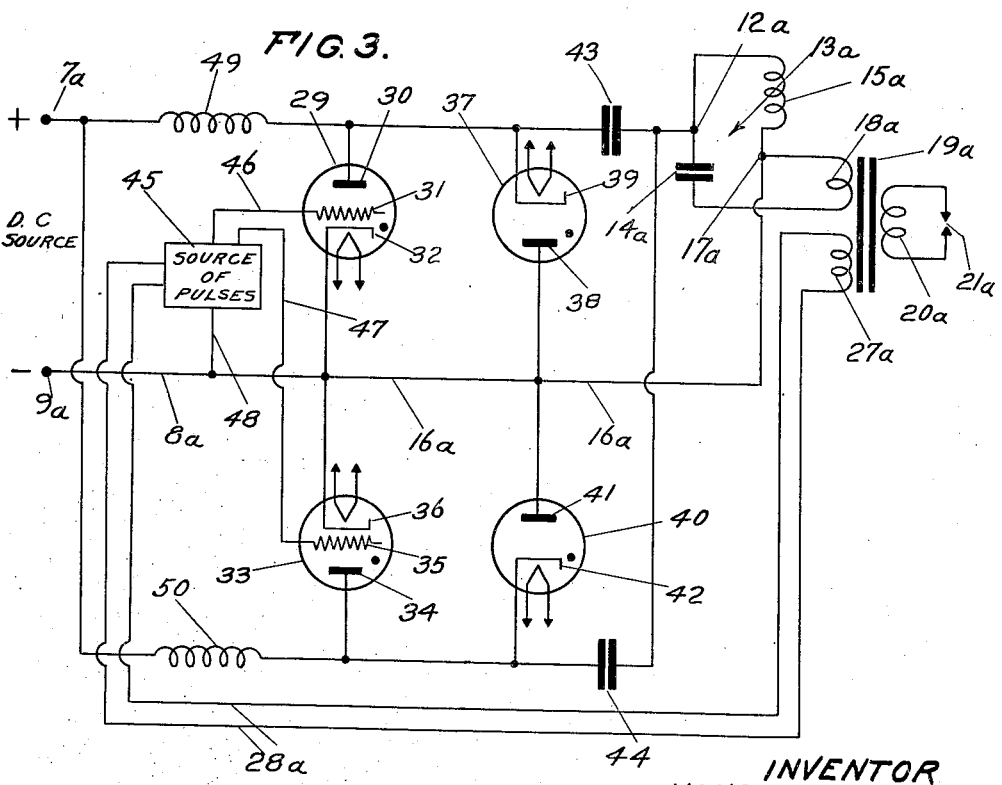
INVENTOR
HANS KLEMPERER
BY Elmer J. Gorn
ATTY.

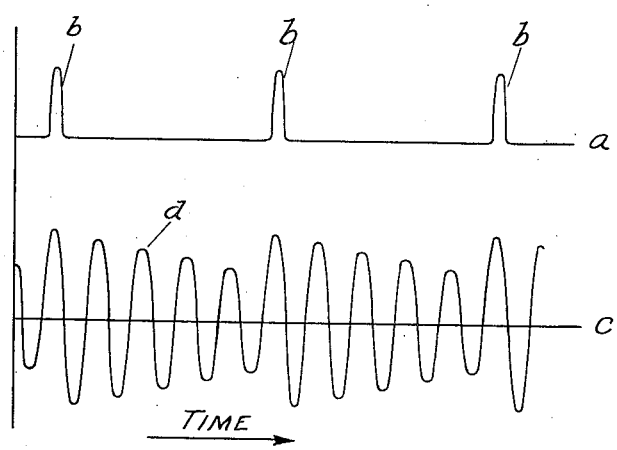
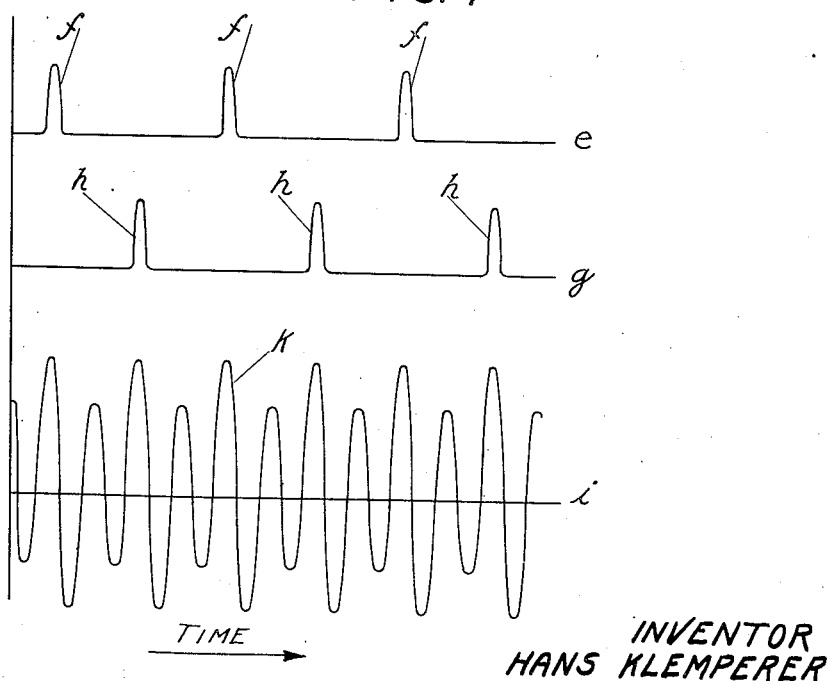

Patented Oct. 25, 1949

2,486,176

UNITED STATES PATENT OFFICE 2,486,176

SHOCK-EXCITED OSCILLATOR

Hans Klemperer, Belmont, Mass., assignor to Raytheon Manufacturing Company, Newton, Mass., a corporation of Delaware Application February 12, 1946, Serial No. 647,002

12 Claims. (Cl. 250—36)

This invention relates to inverters utilizing controlled gas-filled electrical discharge tubes for converting direct current into high-frequency alternating current.

An object of this invention is to devise a high-frequency inverter using a hot-cathode grid-controlled gas discharge tube.

Another object of the invention is to devise a high-frequency inverter capable of delivering a relatively large amount of power.

A further object is to provide a high-frequency inverter which utilizes a hot-cathode grid-controlled gas tube as the main inverter element, and in which a tuned circuit is the frequency-determining element.

A still further object of this invention is to devise a radio-frequency inverter of the shock-excited type, in which continuous high-frequency oscillations of substantially constant amplitude are produced.

The foregoing and other objects of this invention will be best understood from the following description of some exemplifications thereof, reference being had to the accompanying drawings, wherein:

Fig. 1 is a diagrammatic representation of an inverter system embodying the invention;

Fig. 2 is a set of curves illustrating the mode of operation of the arrangement shown in Fig. 1;

Fig. 3 is a diagram of a modification of the arrangement shown in Fig. 1; and

Fig. 4 is a set of curves illustrating the mode of operation of the arrangement shown in Fig. 3.

The inverter illustrated in Fig. 1 consists of a controlled discharge tube 1. This is preferably a tube of the grid-controlled hot-cathode arc type, known as a thyratron. However, this tube, for reasons that will be explained hereinafter, is provided with a low-pressure atmosphere of hydrogen gas, in contrast to the mercury-vapor atmosphere of the common thyratron. Tube 1 contains an anode 2, a cathode 3, and a grid 4. An inductance 5 is connected from the anode 2 to a conductor 6 which extends to the positive terminal 7 of some suitable direct current source. Cathode 3 is connected, by means of conductor 8, to the negative terminal 9 of said source. A condenser 10 is connected from the anode 2 to a conductor 11 which extends to one terminal 12 of a parallel resonant or tank circuit 13 consisting of a condenser 14 and an inductance 15. Cathode 3 is connected, by means of lead or conductor 16, to the second terminal 17 of tank circuit 13. Load means 18, here shown as the primary of a welding transformer 19, is connected between terminal 17 and the side of condenser 14 which is remote from terminal 12, so that said load means is connected effectively in series in the tank circuit 13. Transformer 19 is shown as having a secondary 20, two electrodes 21 constituting the load thereof. The plate-cathode circuit of tube 1 may be termed the controlled circuit thereof.

Cathode 3 is heated to the temperature of thermionic emission by any suitable heating means, schematically indicated at 22. A rectifier 23 is provided, said rectifier having anode 24 and cathode 25, the cathode being of the indirectly-heated type as indicated. This rectifier is preferably a hot-cathode diode having an atmosphere of mercury vapor therein. Anode 24 is connected to lead 16, and thereby to cathode 3 of tube 1, while cathode 25 is connected to anode 2 of tube 1, between said anode and condenser 10. A frequency-controlled or synchronized multivibrator or pulser 26 is connected between grid 4 and cathode 3, in order to supply positive pulses to the grid or controlling element of tube 1. The frequency control voltage for multivibrator 26 is obtained from a coil 27 which is inductively coupled to load means 18, and this voltage is applied to multivibrator 26 via a conductor 28 in order to control the frequency of said multivibrator at an order of division, or a submultiple, of the frequency appearing in coil 27. Pulser 26 is therefore arranged to produce positive pulses in grid circuit of tube 1 at a frequency which is an integral submultiple of the frequency appearing in the tank circuit 13. Such controlled-frequency multivibrators or pulsers are well-known to those skilled in the art.

It has been found that the deionization time of a hydrogen-filled thyratron (the time elapsing before the grid can regain control after the arc is extinguished by lowering of anode voltage) is much less than the deionization time of a mercury-vapor thyratron. The relative deionization time of a gas tube has been found to be approximately directly proportional to the square root of the atomic (or molecular) weight of the vapor in the envelope, so that a hydrogen-filled thyratron ($H_2$, molecular weight 2) has a deionization time which is about $\frac{1}{10}$ that of a mercury-filled thyratron (Hg, atomic weight approximately 200). Since the deionization time of the hydrogen-filled thyratron 1 is so short, the tube may be effectively used at high frequencies. Tank circuit 13 is arranged to have parallel resonance at a frequency in the R. F. range, for example 100 kc., and is a high Q circuit. When a positive pulse is supplied from multivibrator 26 to grid 4 of tube 1, the anode-cathode arc path is completed in this tube and current flows in said path. When the current begins to flow in this path, an impulse is effectively applied across tank circuit 13, which shock excites the tuned circuit, as a result of which the tuned circuit goes into oscillations at its resonant frequency. These oscillations serve to produce alternating current in the plate-cathode circuit of tube 1, and when the potential of anode 2 goes negative with respect to cathode 3, the arc in tube 1 goes out. The pulses supplied by multivibrator 26 are of shorter duration than the time of a half-cycle of the frequency of oscillation of tank circuit 13, so that the grid 4 of tube 1 is no longer positive when the arc in tube 1 goes out, and therefore the tube is not immediately re-fired when this occurs. Rectifier tube 23 is connected in such a manner as to be conducting on inverse voltage, when the anode 2 of tube 1 is negative with respect to its cathode. Tube 23 therefore reduces or shunts the inverse voltage which is applied across tube 1, thereby reducing the possibility of arcback in tube 1. Tube 23 does not take away the entire inverse voltage from tube 1, but leaves enough to be applied to said tube to extinguish the arc therein on the first negative half-cycle (of the oscillation frequency of tank circuit 13) after the tube is fired.

The oscillations set up in tank circuit 13 are applied to a useful load 18, 19, 20, 21, and are also applied, by means of inductively-coupled coil 27 and leads 28, to the multivibrator 26. As stated above, this multivibrator produces positive pulses at a periodicity which is an integral submultiple of the oscillation or output frequency. For example, if the oscillation frequency is 100 kc. or 100,000 cycles per second, the pulse rate may be 10,000 pulses per second. Due to the very short deionization time of tube 1, this tube may be easily turned on or triggered by its grid 4 at a rate as high as 10,000 times per second. After the tube 1 has been extinguished by the oscillations effectively applied across its plate-cathode circuit, as described above, one ten-thousandth of a second after the first firing it is again fired by the next positive pulse supplied to its grid from multivibrator 26. The multivibrator 26 is effectively "locked in" or synchronized by the control voltage supplied thereto from coil 27 via leads 28, so that the periodicity of the pulse output of multivibrator 26 will at all times be an exact integral submultiple of the oscillation frequency. Therefore, at all times the tube 1 will be triggered or fired in phase with the oscillations in tank circuit 13, and the pulses of current produced by the firings of tube 1 will provide periodic shock-excitation impulses for tank circuit 13 which will be in phase with the oscillations already occurring in tank circuit 13. These oscillations will have decreased in amplitude slightly from their original high amplitude produced by the preceding shock excitation provided by the preceding firing of tube 1, but will still be of a relatively high amplitude. If, then, a succeeding shock-excitation impulse is applied to tank circuit 13 in phase with the oscillations already occurring therein, these oscillations will be brought back to their original amplitude level, and, if this is done periodically, the result will be continuous oscillations of substantially constant amplitude, because each shock-excitation impulse will be applied to tank circuit 13 before the oscillations resulting from the previous shock-excitation impulse have entirely died away. Large amounts of power at high frequency may therefore be applied to a load 18, 19, 20, 21, due to the high current capacity of tube 1 and the short deionization time of tube 1, together with the in-phase shock excitations of the parallel resonant circuit 13.

The foregoing operation may be more clearly understood from the curves of Fig. 2, which represent, schematically, the operation of the circuit of Fig. 1. Along axis $a$ are shown a series of pulses $b$ representing the voltage pulses delivered to grid 4 of tube 1 from the multivibrator 26. Along axis $c$ is shown a voltage wave $d$ representing the oscillations appearing in tank circuit 13, which oscillations are utilized in the load device as the output of the inverter. It will be seen that pulses $b$ occur at a periodicity which is an integral submultiple of the oscillation frequency, and are therefore in phase with wave $d$. Wave $d$ has its maximum amplitude at times of occurrence of pulses $b$, because these pulses fire tube 1 to thereby shock-excite tuned circuit 13. Wave $d$, between the occurrence of consecutive pulses $b$, decreases somewhat in amplitude since it is a shock-excited oscillatory wave, but at the next succeeding pulse $b$ the tuned circuit 13 again receives a shock excitation or "kick" due to the flow of current through tube 1, which "kick" is in phase with wave $d$ and brings the oscillatory wave $d$ back up to its original amplitude, from which point it again decreases in amplitude approximately exponentially until the next "kick," in phase with the next pulse $b$. These variations are repeated periodically, as long as the system is energized. Although wave $d$ has been represented as approximately sinusoidal in shape, this is only schematic, as the oscillatory voltage may not be of sinusoidal shape. It is therefore seen that continuous oscillations of substantially constant amplitude are produced in the load device.

Inductance 5 operates as a choke, to keep R. F. out of the D. C. source, while condenser 10 serves to keep the D. C. source from being short-circuited through inductance 15.

Fig. 3 shows a circuit which is a modification of that of Fig. 1. In Fig. 3, certain elements corresponding to those in Fig. 1 are represented by the same numerals but with the addition of the subscript $a$. In Fig. 3, two tubes of the hot-cathode, grid-controlled arc (thyratron) type are used, these tubes having atmospheres of hydrogen as does tube 1 of Fig. 1. Tube 29 has anode 30, grid 31, and indirectly-heated cathode 32, while tube 33 has anode 34, grid 35, and indirectly-heated cathode 36. The anodes 30 and 34 are both connected, through the respective R. F. chokes 49 and 50, to the positive terminal 7a of any suitable direct current source. The cathodes 32 and 36 of tubes 29 and 33, respectively, are both connected by means of lead 8a, to the negative terminal 9a of the source. Two rectifiers 37 and 40 are provided, both being similar in structure to rectifier 23 of Fig. 1. Rectifier 37 has anode 38 and indirectly-heated cathode 39, while rectifier 40 has anode 41 and indirectly-heated cathode 42. Anodes 38 and 41 are both connected to lead 16a, which is connected at one end to cathodes 32 and 36 and at its opposite end to terminal 17a of tank circuit 13a. Cathode 39 of rectifier tube 37 is connected directly to anode 30 of tube 29, while cathode 42 of rectifier tube 40 is connected directly to anode 34 of tube 33. Anode 30 is connected through coupling condenser 43 to terminal 12a of tank circuit 13a, while anode 34 is connected through coupling condenser 44 to the same terminal 12a. Tank circuit 13a is constituted by condenser 14a, inductance 15a, and load means 16a, as in Fig. 1, the load itself actually comprising elements 18a, 19a, 20a, and 21a. The high-frequency oscillations appearing in load coil 18a are again used as the control frequency or voltage for a multivibrator or pulser 45, being applied thereto by means of inductively-coupled coil 27a and leads 28a. Multivibrator 45 is of the type which will, in response to a control voltage of a certain frequency, "lock in" and produce two series of positive pulses, each series having the same periodicity, which periodicity is an even integral submultiple of the control frequency, and the individual pulses of each series being displaced 180° in phase from each other, or in other words, each pulse of either series is spaced, in time, exactly midway between any two successive pulses of the other series. Each of these two series of pulses is produced at a different point in the circuit of multivibrator 45, to which points leads 46 and 47, respectively, are connected. Such controlled-frequency pulsers are well-known to those skilled in the art. The common output lead 48 of pulser 45 is connected to common cathode lead 8a, while lead 46 is connected to grid 31 of tube 29 and lead 47 is connected to grid 35 of tube 33, so that one series of positive pulses is used to control tube 29 and the other to control tube 33.

When a positive pulse is applied by pulser 45 to grid 31 of tube 29, the anode-cathode path of said tube is completed by the arc, and a pulse of current flows through said tube. This pulse of current shock-excites the tuned or tank circuit 13a, setting it into oscillation in the same manner as in Fig. 1. The oscillatory voltage produced in the tank circuit serves to quench tube 29 in the same way described above in connection with Fig. 1, grid 31 having been turned to its original negative potential before the plate 30 of tube 29 goes negative with respect to its cathode. Rectifier tube 37 serves to protect its associated tube 29 from high inverse voltages, in the same way that rectifier tube 23 protects tube 1 in Fig. 1. At a period of time which is a whole number of cycles of the oscillatory voltage later (the oscillatory voltage having been decaying in amplitude meanwhile), a positive pulse appears at lead 47 of pulser 45 and is applied to grid 35 of tube 33, firing said tube. This positive pulse will be in time-phase with the oscillatory voltage of the tank circuit because the oscillatory frequency itself is used to control the pulser and because the pulser is designed to produce pulses having a periodicity which is an even integral submultiple of the control frequency. When tube 33 is fired, the flow of current through it provides a pulse which again shock-excites tank circuit 13a, and because this shock-excitation pulse is in time-phase with the oscillatory voltage, it restores said oscillatory voltage to its original high amplitude. Tube 33 is quenched by the oscillatory voltage similarly to tube 29 and is held quenched because, at the time its plate potential becomes negative with respect to its cathode, its grid potential is at its original negative value. Rectifier tube 40 serves to protect its associated tube 33 from high inverse voltages, in the same way that rectifier tube 37 acts to protect tube 29.

After tube 33 has fired, and, by its firing, has served to shock-excite tuned circuit 13a, the oscillatory voltage again begins to decrease in amplitude. Tube 29 is fired a few cycles later by the second positive impulse appearing at lead 47 and, by the current flow through it, produces a pulse which again "kicks" or shock-excites tuned circuit 13a, bringing the oscillatory voltage back up to its original amplitude. This "kick" produced by the firing of tube 29 will be in phase with the oscillatory voltage because of the fact that the pulse periodicity appearing at lead 46 is an even integral submultiple of the oscillatory frequency of tank circuit 13a. The oscillatory voltage then decreases slightly in amplitude until the next "kick" produced by the firing of tube 33, which will again be in phase with the oscillatory voltage and will bring it back to its former amplitude. The above variations are repeated periodically.

The foregoing operation of Fig. 3 may be more clearly understood from the curves of Fig. 4, which represent, schematically, the operation of the circuit of Fig. 3. Along axis $e$ are shown a series of pulses $f$ representing the voltage pulses delivered to grid 31 of tube 29 over lead 46 from multivibrator 45. Along axis $g$ are shown a series of pulses $h$ representing the voltage pulses delivered to grid 35 of tube 33 over lead 47 from pulser 45. It will be noted that each of the pulses $h$ occurs at a time midway between two successive pulses $f$. Along axis $i$ is shown a voltage wave $k$ representing the oscillatory voltage appearing in tank circuit 13a, which voltage is utilized in the load device as the output of the inverter. It will be seen that pulses $f$ and pulses $h$ both occur at a periodicity which is an even integral submultiple of the oscillation frequency, and are therefore both in phase with wave $k$. It will be noted that wave $k$ has a maximum amplitude at the time of occurrence of the first of the $f$ pulses, because this pulse fires tube 29 and shock-excites tuned circuit 13a. Between this point and the time of occurrence of the first of the $h$ pulses, the oscillatory voltage wave $k$ decreases in amplitude slightly, as will be noted. Then, when the first $h$ pulse fires tube 33, the tuned circuit 13a is again given a "kick," bringing the voltage $k$ back up to its original amplitude. Between the first $h$ pulse and the second $f$ pulse, the voltage $k$ again decreases slightly in amplitude. When the second $f$ pulse again fires tube 29, tuned circuit 13a is given another "kick" and voltage $k$ is again brought up to its maximum amplitude level. It then starts to decay again, and the variations occur periodically as long as the system is energized. An inspection of wave $k$ shows that continuous oscillations of substantially constant amplitude are produced in the load device.

It should be remembered that, in order for the system to operate efficiently, the pulses supplied by multivibrator 26 or by multivibrator 45 must be of shorter duration than the time of a half-cycle of the frequency of oscillation of the tank circuit, since, if they were not, the shock-excitation pulses would tend to overlap the half-cycles of the oscillation voltage and would cut down the amplitude of said voltage because of the fact that there would no longer be an exact in-phase relationship between the shock-excitation pulses and the oscillatory voltage.

Of course, it is to be understood that this invention is not limited to the particular details as described above, as many equivalents will suggest themselves to those skilled in the art. For example, an alternating current source may be used as the supply for the plate and cathode circuits. The main power tubes may be cold-cathode mercury-pool tubes having igniting electrodes. Other types of tubes may be used as rectifiers, such as hot-cathode high-vacuum tubes or mercury-pool rectifiers having continuous excitation. In fact, any type of rectifying tube may be used, as long as there is a permanent source of electrons for the tube. A gas-filled tube is preferable, however, because of its inverse voltage characteristics. Various other variations will suggest themselves. It is accordingly desired that the appended claims be given a broad interpretation commensurate with the scope of this invention within the art.

What is claimed is:

1. An inverter comprising a hydrogen-filled thyratron having at least anode, cathode and grid elements, a source of periodic voltage pulses connected to said grid and cathode elements, a resonant circuit connected to said anode and cathode elements, the frequency of said pulses being lower than of the frequency at which said resonant circuit is resonant, said frequency being controlled by a subharmonic of a voltage derived from said resonant circuit, and means connected directly across said anode and cathode elements to bypass peak inverse voltages around said thyratron.

2. An inverter comprising a controlled electrical space discharge device having a controlling element and a controlled circuit, a resonant circuit connected to said controlled circuit, means for producing voltage impulses at a frequency which is a subharmonic, other than the first subharmonic, of the frequency of a control voltage, said means being directly connected to said controlling element, and means for supplying an oscillatory voltage obtained from said resonant circuit to said first-named means as said control voltage.

3. An inverter comprising a controlled electrical space discharge device having a controlling element and a controlled circuit, a resonant circuit connected to said controlled circuit, a frequency-controlled pulse source for producing voltage impulses at a periodicity which is a submultiple of the frequency of a control voltage, other than the first submultiple, said source being directly connected to said controlling element, and means for supplying to said sources as said control voltage an oscillatory voltage obtained from said resonant circuit.

4. An inverter comprising a thyratron having at least anode, cathode, and grid elements, a resonant circuit connected to said anode and cathode elements, means for producing voltage impulses at a periodicity which is a submultiple of the frequency of a control voltage, other than the first submultiple, said means being directly connected to said grid and cathode elements, and means for supplying to said first-named means as said control voltage an oscillatory voltage obtained from said resonant circuit.

5. An inverter comprising a hydrogen-filled thyratron having at least anode, cathode, and grid elements, means for supplying a positive potential to said anode and a negative potential to said cathode, a parallel resonant circuit connected between said anode and cathode elements, a frequency-controlled pulse source for producing voltage impulses at a periodicity which is a submultiple of the frequency of a control voltage, lower than the first submultiple, said source being directly connected between said grid and cathode elements, means for supplying to said source as said control voltage an oscillatory voltage obtained from said resonant circuit, and means connected directly across said anode and cathode elements to bypass peak inverse voltages around said thyratron.

6. An inverter comprising a pair of controlled electrical space discharge devices each having a controlling element and a controlled circuit, a resonant circuit connected to said controlled circuits, means for producing two series of voltage impulses, each series having a periodicity which is a submultiple of the frequency of a control voltage, other than the first submultiple, means for applying one series of impulses directly to one of said controlling elements, means for applying the other series of impulses directly to the other of said controlling elements, and means for supplying an oscillatory voltage obtained from said resonant circuit to said first-named means as said control voltage.

7. An inverter comprising a pair of controlled electrical space discharge devices each having a controlling element and a controlled circuit, a resonant circuit connected to said controlled circuits, means adapted to produce two series of voltage impulses, each series having a periodicity which is a submultiple of the frequency of a control voltage and each impulse of either series being spaced midway between successive impulses of the other series, means for applying one series of impulses to one of said controlling elements, means for applying the other series of impulses to the other of said controlling elements, and means for supplying a control voltage obtained from said resonant circuit to said first-named means.

8. An inverter comprising a pair of thyratrons each having at least anode, cathode, and grid elements, a resonant circuit connected between the anodes and cathodes of both said thyratrons, a frequency-controlled multivibrator adapted to produce two series of voltage impulses, each series having a periodicity which is a submultiple of the frequency of a control voltage and each impulse of either series being spaced midway between successive impulses of the other series, means for applying one series of impulses between the grid and cathode of the other of said thyratrons, and means for supplying a control voltage obtained from said resonant circuit to said multivibrator.

9. An inverter comprising a pair of hydrogen-filled thyratrons each having at least anode, cathode, and grid elements, means for supplying a positive potential to said anodes and a negative potential to said cathodes, a parallel resonant circuit connected between the anodes and cathodes of both of said thyratrons, a frequency-controlled multivibrator adapted to produce two series of voltage impulses, each series having a periodicity which is a submultiple of the frequency of a control voltage and each impulse of either series being spaced midway between successive impulses of the other series, means for applying one series of impulses between the grid and cathode of one of said thyratrons, means for applying the other series of impulses between the grid and cathode of the other of said thyratrons, means for supplying a control voltage obtained from said resonant circuit to said multivibrator, and a pair of means acting to bypass peak inverse voltages around said thyratrons, one of said last-named means being connected between the anode and cathode elements of each of said thyratrons.

10. An electrical discharge device, comprising an anode and a cathode, means for discharging said device at regular intervals, a resonant circuit fed by said discharge device, said means for discharging being controlled by pulses derived from said resonant circuit, and the resonant frequency of said resonant circuit being a harmonic, other than the first harmonic, of the frequency of said pulses.

11. An inverter, comprising a grid-controlled gas discharge device, means for pulsing said device at a frequency wherein the period of one cycle thereof is greater than the minimum time necessary to deionize said discharge device, a resonant circuit energized by said discharge device, the resonant frequency of said circuit being a harmonic of said pulsing frequency wherein one cycle of said harmonic frequency has a period less than said deionization time.

12. An inverter, comprising a grid-controlled gas discharge device, means for pulsing said device at a frequency wherein the period of one cycle thereof is greater than the minimum time necessary to deionize said discharge device, a resonant circuit energized by said discharge device, the resonant frequency of said circuit being a harmonic of said pulsing frequency wherein one cycle of said harmonic frequency has a period less than said deionization time, and means for controlling said pulse frequency, comprising an oscillatory voltage derived from said harmonic frequency.

HANS KLEMPERER.

REFERENCES CITED

The following references are of record in the file of this patent:

UNITED STATES PATENTS

| Number | Name | Date |
| --- | --- | --- |
| 2,103,090 | Plebanski | Dec. 21, 1937 |
| 2,209,507 | Campbell | July 30, 1940 |
| 2,266,668 | Tubbs | Dec. 16, 1941 |
| 2,300,429 | Meacham | Nov. 3, 1942 |
| 2,390,659 | Morrison | Dec. 11, 1945 |
| 2,411,898 | Schelleng | Dec. 3, 1946 |